United States Patent [19]

Van Dyck

[11] Patent Number: 4,815,869
[45] Date of Patent: Mar. 28, 1989

[54] METHOD OF MULTICOLOR PRINTING WITH MATRIX PRINTER

[76] Inventor: John Van Dyck, 2405 N. Fry St., Boise, Id. 83704

[21] Appl. No.: 148,643

[22] Filed: Jan. 26, 1988

[51] Int. Cl.$^4$ .............................................. B41J 3/46
[52] U.S. Cl. .................... 400/83; 400/216.1; 400/206; 346/76 PH; 358/75; 358/296
[58] Field of Search ........... 400/83, 120, 216.1, 400/240, 240.3, 240.4, 206; 364/188, 191, 900; 346/76 PH, 74.7; 358/75, 80, 296

[56] References Cited

U.S. PATENT DOCUMENTS

| | | | |
|---|---|---|---|
| 3,781,902 | 12/1973 | Shim et al. | 346/138 |
| 4,280,767 | 7/1981 | Heath | 400/240.4 |
| 4,287,521 | 9/1981 | Hakoyama | 400/120 |
| 4,469,459 | 9/1984 | Trezise et al. | 400/216.1 |
| 4,530,612 | 7/1985 | Butera | 400/240.4 |
| 4,570,217 | 2/1986 | Allen et al. | 364/900 |
| 4,586,055 | 4/1986 | Matsushima | 400/240 |
| 4,594,597 | 6/1986 | Liu et al. | 400/240.3 |
| 4,611,217 | 9/1986 | Iizuka et al. | 400/240 |
| 4,707,706 | 11/1987 | Nagano | 346/76 PH |

FOREIGN PATENT DOCUMENTS 80350   6/1983   European Pat. Off. ............. 400/83

OTHER PUBLICATIONS

"Screen Copier for a Color Display", IBM Tech. Disc. Bulletin, vol. 27, No. 3, Aug. 1984, pp. 1553-1555.
"Operator-Controlled Contrast and/or Color Selector for Display Terminals", IBM Tech. Disc. Bulletin, vol. 27, No. 7B, Dec. 1984, pp. 4316-4317.
"Method for Producing a Hard Copy of a Colored Screen Image Using a Monochrome Printer", IBM Tech. Discl. Bulletin, vol. 28, No. 1, Jun. 1985, pp. 294-296.

Primary Examiner—Eugene H. Eickholt
Attorney, Agent, or Firm—Frank J. Dykas

[57] ABSTRACT

A method of printing multi-color images using a printer 12 having the capacity to print only one color at a time, a plurality of interchangeable colored ribbons 14 for use with said printer 12, a computer 10, and a computer monitor 11, having a list of steps 101 of displaying on the computer monitor all that is to be printed, and then removing from the display all that is to be printed that is not black and selectively identifying each single color from a plurality of colors displayed with the desired multi-color printed image displayed upon the screen. The operator then installs into the printer 12 a colored ribbon 14 for printing the selected color and prints the selected color. After which the paper 13 is reset and the operator repeats the procedure for each of the plurality of colors contained within the desired multi-colored printed image.

2 Claims, 2 Drawing Sheets

METHOD OF MULTICOLOR PRINTING WITH MATRIX PRINTER

BACKGROUND OF THE INVENTION

1. Technical Field

The present invention relates to a method for the production of multicolored printed images of computer stored information and more particularly to a method of using a single ribbon printer to produce colored printouts by use of a plurality of different colored ribbon cartridges and repeated printing runs.

2. Background Art

A computer having color graphic capability utilizes a color video monitor having the standard red, green and blue electron gun assemblies. The computers, at least those commonly available for home or personal use, use a color graphic system wherein each variant or shade of color, ranging across the spectrum from red to violet, and including black and white, are assigned an individual color identification statement. Hence, depending upon the capacity of the computer, the number of various shades of color are usually limited. For example, a small personal computers may have the capacity to graphically display 16 to 512 different shades of color.

The color identification statements are held in the compiler and are used to instruct the color monitor as to the particular combinations of red, blue and green electron beam strengths necessary to produce the desired color.

Printing a color graphic image from a computer is another matter. One method of reproducing a color graphic image from a computer onto a fixed medium such as paper is to employ individual colored inked ribbons for each color identification statement for which the computer is capable of reproducing. A second is to employ the three primary painting colors, red, yellow and blue in the various appropriate painting mixtures to reproduce the desired shade of color.

The first method identified above is not a practical solution in that printing devices are not available which can be utilized to automatically sort through and print from hundreds of differently colored inked ribbons. And usually multiple colored inked ribbons contain no more than five different, primary type, colors and as a result are only suitable for simple graphics and other displays which do not call for subtle shades or mixtures of color. Such a device is disclosed in TREZISE, ET AL., U.S. Pat. No. 4,469,459, wherein a color impact matrix printer has a plurality of individually color inked cartridges incorporated into the device which are selectively brought into engagement with the print head. The device is obviously mechanically complicated.

The second method of reproducing a colored graphic image is, as stated before, the mixing of primary inking colors of red, yellow and blue. By utilizing this method, a printer memory, whether it be stored in the printer, or in the compiler of the computer, must contain information to convert color identification statements from the color computer into instructions concerning the appropriate mixture of the three primary inking colors. This type of system will reproduce all of the color identification statements of the particular color computer in use, and generally allows for better color graphic capability, including the reproduction of more subtle tones and shades of colors.

Devices which take advantage of these features are similar to that disclosed in MATSUSHIMA, U.S. Pat. No. 4,586,055, which teaches a printer having an array of printing devices for imparting color to a fixed printing medium such as paper. It is also an expensive and complicated device. Similarly, LIU, ET AL., U.S. Pat. No. 4,594,597, also discloses a similar primary color mixture printing device which utilizes a rotating drum to make repeated passes with the fixed printing medium across a single printing device which prints from an array of internal different colored printing ribbons.

All three devices disclosed above are complicated, and not readily available for home or personal computer use. What is currently available for home or personal computer use is a wide variety of simple, inexpensive, single color dot matrix printers which have a single printing head and utilize removable inked ribbon cartridges.

What is needed is a method by which the currently and readily available, single color printers currently in use can be utilized to reproduce multicolor computer images either by the use of a preselected, limited number, of interchangeable color inked ribbons or by the blending of primary color inked ribbons to match computer color identification statements.

DISCLOSURE OF INVENTION

Accordingly, it is an object of this invention to provide a method for using a single color dot matrix printer having an interchangeable ribbon capability to produce multiple color colored images utilizing either limited numbers of preselected color inked ribbons or a blending technique for primary color inked ribbons to reproduce multiple color images. Another object of this invention is to provide a method which can be utilized with home or personal computers having limited memory capacity.

Another object of this invention is to provide a method which can be used with a minimum of training and computer use skills.

These objects are accomplished by the use of a plurality of colored inked ribbons cartridges compatible with the particular printer in use, a computer program written in the appropriate programing and machine language for the personal or home computer in use, and an operator method which enables the operator to reproduce multicolor graphic images.

More particularly a method for obtaining a color printout from a dot matrix printer able to print only a single color at a time by using a dot matrix computer printer, a black colored ribbon, a red colored ribbon, a blue colored ribbon, a yellow colored ribbon, a computer, and a computer monitor. The desired image is first displayed on the computer monitor. The image is then analyzed and all that is not black is removed from the screen, and the resulting image is then printed by the dot matrix printer using a black colored ribbon starting a known reference point. After the printing run, the printer is reset to the initial reference point.

Once again the desired image is displayed on the computer monitor. The image is analyzed and all that is not red or does not have red as one of its primary component colors is removed from the computer monitor. The resulting image is then printed by the dot matrix printer using a red colored ribbon. Again, after the printing run the printer is reset to the initial reference point.

The original desired image is again displayed on the computer monitor. The image is analyzed and all that is not blue or does not have blue as one of its primary component colors is removed from the display. The resulting image is then printed by the dot matrix printer using a blue colored ribbon. Again, after the printing run, the printer is reset to the initial reference point.

The original desired image is once more displayed on the computer monitor. The image is analyzed and all that is not yellow or does not have yellow as one of its primary component colors is removed from the display. The resulting image is then printed by the dot matrix printer using a yellow colored ribbon and the desired printout is obtained.

BEST MODE FOR CARRYING OUT INVENTION

Figure 1:
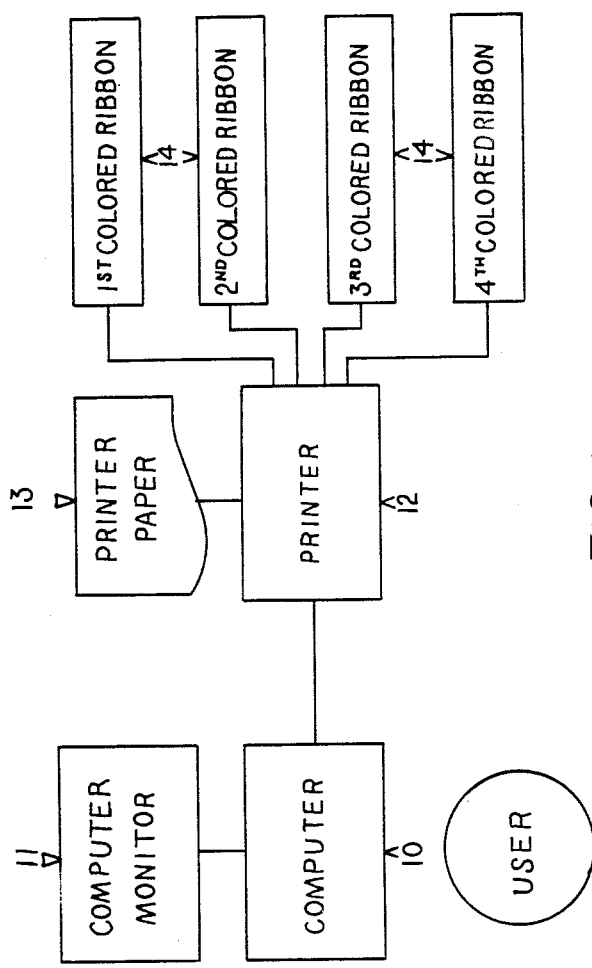
FIG. 1 is a block representation of the components necessary to obtain a color printout from a single color printer.

FIG. 1 depicts a block diagram of computer 10, video monitor 11, printer 12, printer paper 13, and a plurality of colored printer ribbons 14, all are of standard design. The invention comprises a method for obtaining color printouts from a single colored ribbon dot matrix computer printer 12.

The first step in said method is displaying the desired image on computer monitor 11. The number of desired colors is then selected. Then the multicolored composite image is separated into individual mono-colored component images. These mono-colored component images are then affixed to a medium one over the other by a dot matrix computer printer 12 fitted with a different colored ribbon 14 for each individual mono-colored component image printing run. Said method uses a registration system created by the user, in most cases, which entails providing a reference mark at the top of the desired printout so further individual monocolored component image prints can be started at the same exact location on the printout medium as previously used for prior mono-colored image printing runs. However, it shall be pointed out this can also be accomplished by programming the computer to affix the reference mark to the desired printout.

Figure 2:
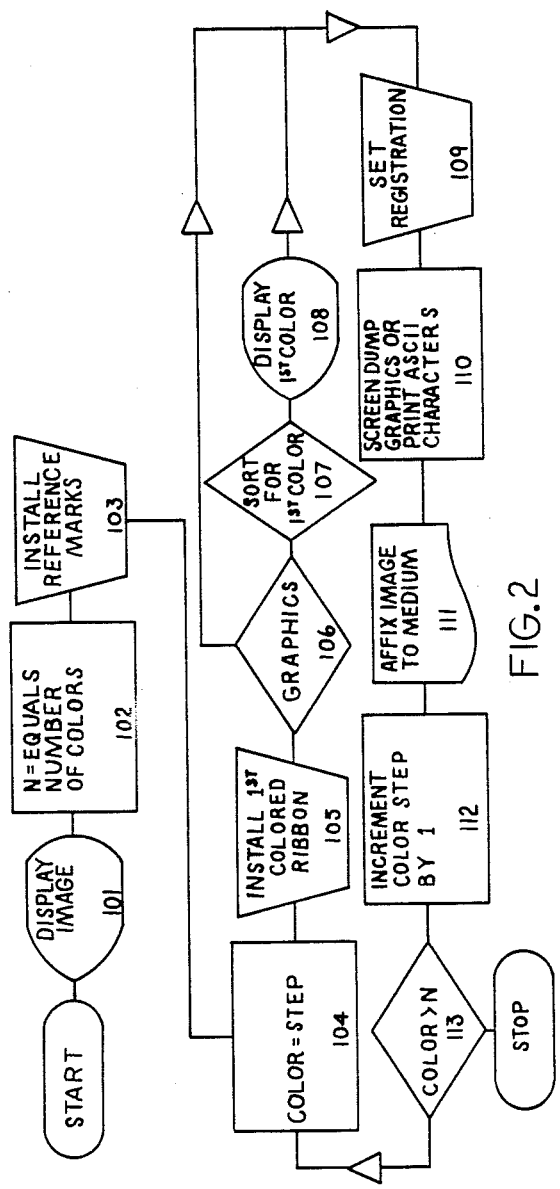
FIG. 2 is a flow chart representing the preferred method step sequence.

Referring to FIGS. 1 and 2, the following illustrates a preferred method of obtaining a color printout of a color computer monitor image; this is referred to hereinafter as the "what you see is what you get" (WYSIWYG) mode. An alternative mode is the subliminal dot address mode, which is commonly used with monochrome displays.

The subliminal addressing mode generally refers to color image which is displayed on a monochrome monitor. Although the image appears only in one color, the associated graphics still carry the color assignments in memory. A further use of subliminal addressing might be identifying a displayed color so the printing run could be looped to print the same graphics with different colored ribbons one over the other.

To obtain a color printout in the WYSIWYG mode, the desired image is displayed on computer monitor 11. The first step in the method is displaying image 101. Then the total number of colors to be printed is selected, this is represented as step 102, wherein the variable N is given a value equal to the total number of colors, and a color variable is defined. Any one or more of the printed colors can be combinations of said colored ribbons 14 of FIG. 1. Step 103 is the installation of a registration system. Said registration system consists of affixing a reference mark at the beginning of desired printout. Step 104 consists of assigning the current step value to the color variable. The installation of the colored ribbon corresponding to the color number is step number 105. Step 106 is deciding a graphics screen dump or an ASCII (American Standard Code Information Interchange) print is appropriate. If the character or characters to be printed are ASCII characters the process flow is diverted to step 109. Step 107 is a sorting process where colors other than the current color are eliminated temporarily. The resulting image is a mono-colored component image. This mono-colored component image being displayed on the computer monitor and is step 108. Step 109 sets the registration system by aligning the said reference mark with a reference point on the printer. Step 110 consists of transferring the mono-colored component image via a screen dump or an ASCII print routine. Step 111 is the actual affixing of the mono-colored component image to the said medium. Step 112 consists of incrementing the color variable by one. The final step, 113, of the main loop, steps 104–113, is a comparison of the current numerical value of the color variable with said N value. If the value of the color variable is less than or equal to N the process is repeated beginning with step 104. If the value of said color variable is greater than N, then the loop is terminated, as illustrated in step 114.

While there is shown and described the present preferred embodiment of the invention, it is to be distinctly understood that this invention is not limited thereto but may be variously embodied to practice within the scope of the following claims.

I claim:

1. A method of affixing multi-color printed images to a medium using a printer having the capacity to print only one color at a time, interchangeable colored ribbons for use with said printer, a computer and a computer monitor which comprises:
   displaying on the computer monitor all that is to be printed;
   removing from the display all that is to be printed that is not black;
   selectively identifying each single color from a plurality of colors displayed within the desired multi-color printed image displayed upon the monitor;
   installing into the printer a colored ribbon for printing th selected color;
   inserting into the printer the medium onto which the multi-color printed image is to be affixed;
   marking a starting reference point on said medium;
   printing the selected color upon the medium;
   resetting the medium to the reference point;
   repeating the procedure-for each of the plurality of colors contained within the desired multi-colored printed image.

2. A method of affixing multi-color printed images to a medium using a printer having the capacity to print only one color at a time, interchangeable colored ribbons for use with said printer, a computer and a computer monitor, which comprises:
   displaying on the computer monitor all that is to be printed;
   removing from the display all that is to be printed that is not black;
   inserting into the printer the medium onto which the multi-color printed image is to be affixed;

marking a starting reference point on said medium;
inserting a black colored ribbon into said printer;
printing all of the multi-colored image that is to be black;
resetting the medium to the reference point;
removing the black ribbon from said printer;
displaying on the computer monitor all of the multi-colored image that is to be red or that has red as one of its primary component colors;
inserting into the printer a red colored printing ribbon;
printing all of the multi-colored image that is to be red;
resetting the medium to the reference point;
removing the red ribbon from said printer;
displaying on the computer monitor all of the multi-colored image that is to be blue or that has blue as one of its primary component colors;
inserting into the printer a blue colored printing ribbon;
printing all of the multi-colored image that is to be blue;
resetting the medium to the reference point;
removing the blue ribbon from said printer;
displaying on the computer monitor all of the multi-colored image that is to be green or that has yellow as one of its primary component colors;
inserting into the printer a yellow colored printing ribbon;
printing all of the multi-colored image that is to be yellow;
resetting the medium to the reference point;
removing the yellow ribbon from said printer.

* * * * *